United States Patent [19]

Koyama et al.

[11] Patent Number: 4,907,026
[45] Date of Patent: Mar. 6, 1990

[54] LIGHT PROJECTION SYSTEM FOR AUTOMATIC FOCUS DETECTION

[75] Inventors: Takeshi Koyama; Keiji Ohtaka, both of Tokyo, Japan

[73] Assignee: Canon Kabushiki Kaisha, Tokyo, Japan

[21] Appl. No.: 382,029

[22] Filed: Jul. 19, 1989

Related U.S. Application Data

[63] Continuation of Ser. No. 39,021, Apr. 16, 1987, abandoned.

[30] Foreign Application Priority Data

Apr. 21, 1986 [JP] Japan ............... 61-091702
Jul. 25, 1986 [JP] Japan ............... 61-175076
Jul. 25, 1986 [JP] Japan ............... 61-175077

[51] Int. Cl.$^4$ ............................................. G03B 3/00
[52] U.S. Cl. ................................. 354/403; 354/165
[58] Field of Search ........................... 354/403, 165

[56] References Cited

U.S. PATENT DOCUMENTS 4,067,030  1/1978  Kuramoto et al. ............ 354/165
4,367,934  1/1983  Matsui .......................... 354/165
4,690,538  9/1987  Matsui et al. ................. 354/403

Primary Examiner—Russell E. Adams
Attorney, Agent, or Firm—Fitzpatrick, Cella, Harper & Scinto

[57] ABSTRACT

A focus detecting light projecting system for detecting the focus state of a photo taking optic by projecting a pattern with a light projecting lens onto a photographing object and by receiving a reflected image of the pattern reflected from the objects. The light projecting lens has a plurality of lens parts which have different optical axes and different forward focus-adjusting degrees.

16 Claims, 4 Drawing Sheets

LIGHT PROJECTION SYSTEM FOR AUTOMATIC FOCUS DETECTION

This application is a continuation-in-part continuation of application Ser. No. 039,021 filed Apr. 16, 1987 now abandoned.

BACKGROUND OF THE INVENTION

1. Field of the Invention

This invention relates to a light projection system suited for automatic focus detection in a photographic camera, a motion picture camera, a video camera, etc., and more particularly to an automatic focus detecting light projection system which permits carrying out automatic focus detection with improved accuracy either by a passive or active method, whereby a pattern of light is projected on an object to be photographed and the focal point of a photo taking optical system is automatically detected by receiving an image of a reflected light pattern coming from the object.

2. Description of the Related Art

Heretofore, cameras of varied kinds including the photographic camera, the motion picture camera, video camera, etc. have employed various focus detecting methods, which may be roughly divided into two methods. One is a passive method which is known from, among others, Japanese Laid-Open Patent Application No. 54-159259, etc. The other method is an active method which is known from, among others, Japanese Laid-Open Patent Application No. 57-154206.

In the active method, a light flux such as infrared rays is projected from the camera onto an object to be photographed and the focus is detected by receiving a resultant reflected light flux coming from the object. In accordance with this method, the focus can be accurately detected even in cases where the object is dark or has a low degree of contrast. It is a disadvantage of the method, however, that the focus detecting accuracy lowers in the event of a far distance from the camera to the object as the quantity of the reflected light flux excessively decreases in that event.

In the passive method, the focus is detected when the state of an image of the object which is formed by a photo taking system is detected by detecting means disposed at a part of the camera. It is an advantage of the passive method that the focus detection can be performed at a relatively high degree of accuracy even in the event of an object located at a far distance. However, it is a disadvantage of the method that the focus detecting accuracy lowers in cases where the object is dark or in a low degree of contrast.

A method for eliminating these shortcomings has been proposed, for example, as disclosed in Japanese Patent Publication No. 49-19810. According to the disclosure made in this patent publication, the focus detection is performed by projecting a given pattern of light from the camera onto the object and by detecting an image of the pattern reflected by and coming from the object. However, this method has required use of a light projection system capable of projecting a large quantity of light as the reachable distance of the pattern of light would be excessively limited if the light pattern is projected in a small quantity.

Further, in receiving the reflected pattern from the object with the pattern projected from the light projection system, if the light is not projected via the photo taking system, i.e. through the photo taking lens (TTL), there arises the so-called parallax when a change occurs in the object distance. Therefore, with the exception of TTL arrangement, the projectable distance range of the pattern has been limited. In other words, with the light flux to be projected having been stopped down into a narrow flux in an attempt to increase the intensity of illumination for an object located at a far distance, the parallax would arise when the light flux is projected on another object which is located at a nearer distance and thus the pattern cannot be projected on the object. In that even, it becomes difficult to carry out focus detection.

Meanwhile, Japanese Laid-Open Patent Application No. 56-57012 has disclosed a distance measuring device of the active method. In this case, twin form lenses are arranged to have different optical axes and are disposed in front of a light source for the purpose of broadening the field of distance measurement.

SUMMARY OF THE INVENTION

It is an object of this invention to provide a light projection system for automatic focus detection which is capable of broadening the range of measurable distances by efficiently projecting a pattern on an object to be photographed even in cases where the object is located in a dark place or has a low degree of contrast.

It is another object of this invention to provide a light projecting optical unit which has an improved distance detecting capability not only for far distances but also for near distances.

The above and other objects and features of the invention will become apparent from the following detailed description of embodiments thereof taken in connection with the accompanying drawings.

DETAILED DESCRIPTION OF PREFERRED EMBODIMENTS

Figure 1:
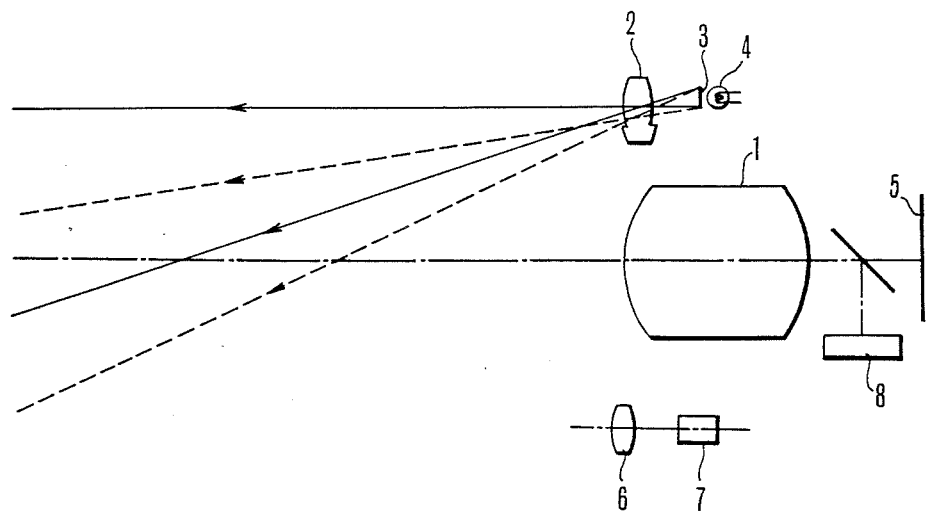
FIG. 1 is a sectional view of an optical system showing an embodiment of this invention.
Figure 2:
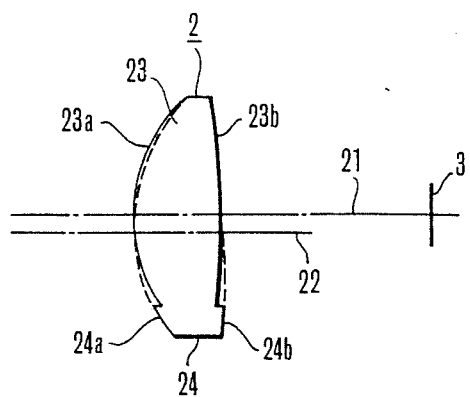
FIG. 2 is a sectional view of a projecting lens.

FIG. 1 shows an optical system and a pattern projecting optical system of a camera. The illustration includes the photo taking lens unit 1 of the camera which is, for example, a single-lens reflex camera; an image receiver 5 which is a film or a solid state image sensor or the like; a projecting lens 2 the details of which are shown in FIG. 2; a pattern 3 which is drawn on a transparent plate and preferably consists of a single or several strips; and a light source 4 which is a lamp or an LED. The light source 4 is arranged to illuminate the pattern 3. The projecting lens 2, the pattern 3 and the light source 4 are placed together within a casing which is not shown and may be removably attached to a camera body as an auxiliary illuminator. Further, the pattern may be formed by arranging LEDs. A focus detecting unit 8 may be formed, for example, with an optical system which is disclosed in U.S. Pat. No. 4,573,784. A light flux incident upon the focus detecting unit 8 is guided by means of a quick return mirror or a half-reflection mirror which is disposed in the optical path of the photo taking lens unit 1. The detecting unit 8 may be disposed in a part of the camera body instead of disposing it in the rear of the photo taking lens unit 1. The illustration further includes a light receiving lens 6 and a light receiving or photo sensitive element 7.

As shown in FIG. 2, the projecting lens 2 comprises two lens parts 23 and 24. The lens part 23 has an optical axis 21 which is arranged in parallel with the optical axis of the photo taking lens unit 1. The lens part 24 has a different optical axis 22. The optical axes 21 and 22 are parallel with each other. In this specific embodiment, the lens parts 23 and 24 are arranged to have about equal focal lengths, i.e. about equal refracting powers. However, they may be arranged to have different refracting powers. Further, three or more than three lens parts may be arranged instead of two. The two lens parts 23 and 24 of the projecting lens 2 are arranged to project the pattern 3 in different directions.

In the case of this embodiment, the pattern 3 illuminated by the light source 4 is projected in two different directions toward the object by means of the projecting lens 2 as mentioned above. For example, the lens part 23 projects the pattern 3 within a range as defined by full lines in FIG. 1 while the other lens part 24 is arranged to project the pattern 3 within another range as defined by broken lines. The pattern projectable range is thus widened by this arrangement to permit projection of the pattern 3 on the surface of the object even when the object moves from a far distance to a near distance.

With the pattern 3 thus projected, a reflected pattern image coming from the object is received by a focus detecting unit 8 via the photo taking lens unit 1 or received by the light receiving lens 6 disposed close to the photo taking lens unit 1 and is guided to the light receiving element 7. A distance to the object is measured by using a signal produced from the light receiving element 7. Then, an in-focus state is attained by shifting a focusing lens group within the photo taking lens unit 1 according to the distance thus measured.

Figure 3:
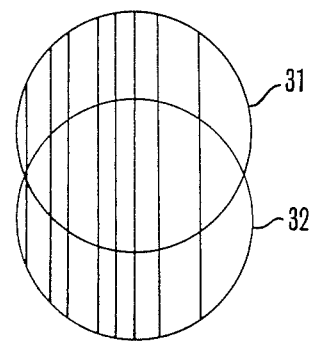
FIG. 3 shows an image of a pattern to be projected.

FIG. 3 shows an image of the pattern projected on the object according to the arrangement of this embodiment. The illustration includes an image 31 of the pattern projected by the lens part 23; and another image 32 of the pattern projected by the lens part 24. The projected pattern image 31 is obtained when the object is located at a far distance and the projected pattern image 32 when the object is located at a near distance.

Generally, a high degree of illuminance is required when the object is located at a far distance. This embodiment is therefore arranged to have a larger effective projection area of the lens part 23 than that of the other lens part 24. Further, in this embodiment, the lens parts 23 and 24 are arranged to have about equal refracting powers to have the projected pattern images formed by them in about the same size. By virtue of this arrangement, the pattern image can be adequately projected throughout the range of photo taking distances as the two projected pattern images overlap each other even when the object is located at an intermediate distance.

Further, the light projecting lens 2 of FIG. 2 may be changed to have the lens surface 23b and 24b formed by one and the same lens surface and arranged to differentiate the optical axes of the lens surfaces 23a and 24a from each other. These optical axes may be differentiated either in parallel with each other or by obliquely arranging the optical axis of the lens part for near distances.

Figure 4:
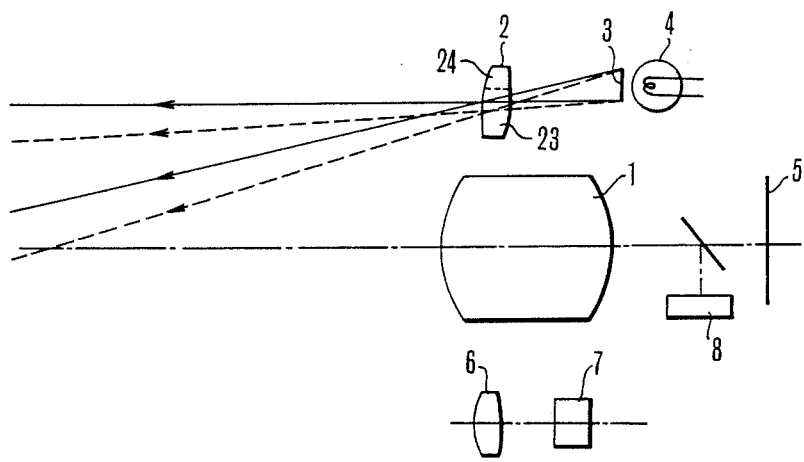
FIG. 4 is a sectional view showing another embodiment of this invention.

FIG. 4 shows another embodiment of the invention. In this case, the projecting lens is arranged to enhance a near distance detecting capability thereof. Referring to FIG. 4, a light projecting lens 2 includes a lens part 23 which is for far distances and has an optical axis 21; and a lens part 24 which is for near distances and has an optical axis 22 differing from the optical axis 21.

The lens parts 23 and 24 are arranged to have about the same focal length, i.e. equal refracting powers. More specifically, one and the same lens is divided into two parts having a boundary between them in parallel with the optical axis thereof. The optical axes of these parts are deviated in parallel. The lens parts 23 and 24 are formed in one body with a plastic material.

Figure 5A:
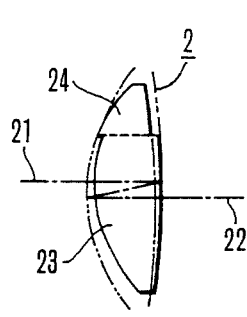
FIGS. 5(A) and 5(B) are sectional views showing a projecting lens respectively.
Figure 5B:
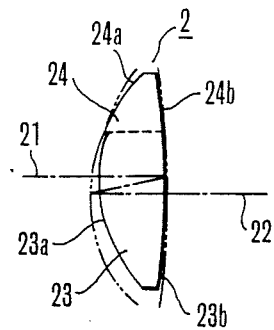
Figure 6:
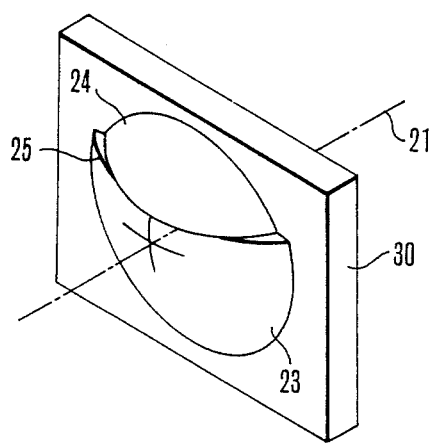
FIG. 6 is an oblique view showing the same projecting lens.

Referring to FIG. 5(A) which shows the light projecting lens 2, the lens part 24 which is for the near distance is shaped to protrude closer to a photographing object than the lens part 23 which is for the far distance. In others words, a curve obtained by extending the lens surface of the lens part 24 is located on the left-hand side of the lens surface of the other lens part 23. FIG. 5(B) shows another projecting lens 2. In this case, the lens part 24a which is for the near distance is arranged to have its lens surface 24a on the object facing side thereof, i.e. a first lens surface, along shaped to protrude closer to the object. FIG. 6 shows in an oblique front view the projecting lens 2 of FIG. 5(B) in a state of being carried by a holding plate 30.

In the case of this embodiment, one of the two lens parts 23 and 24 of about the same focal length is arranged to be in a state of protruding further forward than the other for the purpose of differentiating the focusing positions of them. In other words, the focus position of the lens part 24 is arranged to be nearer to the lens part than that of the other lens part 23 (which is generally in an infinity distance position). The pattern 3 is which is illuminated by the light source 4 is projected by the two lens parts 23 and 24 in two different directions which differ from each other in the object distance as shown in FIG. 4. For example, the lens part 23 forms an in-focus pattern image on an object located at a far distance in the direction shown by full lines. The other lens part 24 in the meantime forms an in-focus pattern image on an object located at a near distance in the direction shown by broken lines. This arrangement effectively improves a blurred state of the pattern image which would result from use of a projecting lens consisting of two lens parts of the same focus position.

Since a high degree of illuminance is generally necessary for an object located at a far distance, the effective projectable area of the lens part 23 is arranged to be larger when that of the lens part 24 in this case.

With the pattern 3 thus arranged to be projected by the lens part for a far distance and the lens part for a near distance respectively for different object distance ranges, the embodiment is capable of always forming sharp pattern images on photographing objects located within a wide range of distances from a far distance to a near distance.

The pattern image is then reflected by and comes from the object. The reflected pattern image from the object is received either by a detecting unit 8 through the photo taking lens unit 1 or by the light receiving element 7 through the light receiving lens 6 which is disposed close to the lens unit 1. The distance to the object or the focus of the photo taking lens unit 1 is detected by using a signal produced from the light receiving element 7 or the detecting unit 8. Then, a driving device which is not shown shifts a focusing lens group disposed within the lens unit 1 to bring the lens unit 1 into an in-focus state according to the result of detection.

The embodiment which is arranged as described above is capable of illuminating with little parallax even when the illuminating light flux diameter is made small by extending the focal length of the light projecting lens.

Generally, the light projecting lens of the kind usuable for this embodiment has the curvature of the first lens surface arranged to be larger than that of the second lens surface for the purpose of correcting the aberration. Further, since there takes place little aberration, particularly spherical aberration, due to variations in thickness, a stepped surface level difference in the meridian section of the whole lens is removed by arranging the first lens surface 24a nearer to the object and the second lens surface 24b nearer to an image plane. The light projecting lens is thus arranged to have no stepped surface level difference and to have a smooth flush surfaces lens shape as a whole, so that the pattern can be efficiently projected without any loss of the light quantity which otherwise would be caused by a stepped difference of surface level.

This embodiment is capable of adequately projecting the pattern images over the whole range of photographing distances with the above stated two projected pattern images overlapping each other even when the object is located at an intermediate distance. In the case of the light projecting lens 2 shown in FIG. 5(B), the lens surface 23b and the lens surface 24b are formed to be flush with each other while the optical axis of one lens surface is differentiated from that of the other.

In the embodiment described, the light projecting lens is formed with a single piece of lens which consists of two lens parts. However, the light projecting lens may be formed with a plurality of lenses which have a plurality of lens parts of different focus positions. In that event, these lens parts may be arranged, for example, to be used for far distance, medium distance and near distance respectively.

Figure 7A:
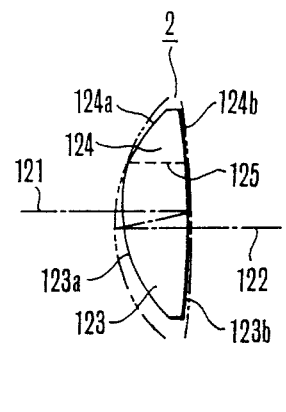
FIG. 7(A) is a sectional view showing another projecting lens.
Figure 7B:
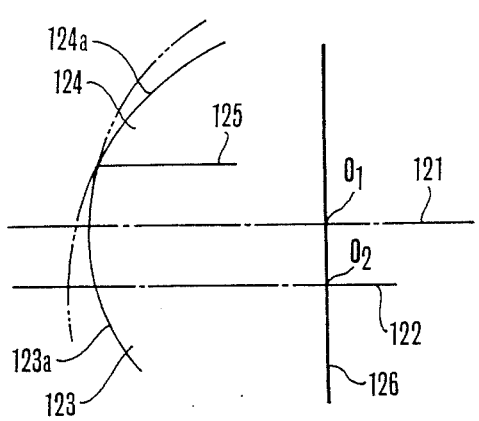
FIG. 7(B) shows the arrangement of the same projecting lens.

FIGS. 7(A) and 7(B) are sectional views showing another example of the light projecting lens arranged as a further embodiment of this invention. In this case, the lens 2 includes a lens part 123 which is for far distances and has an optical axis 121 and another lens part 124 which is for near distances and has an optical axis 122. Each of the lens parts 123 and 124 is divided into two parts in parallel to the optical axis. The, these parts are cemented and shaped in one body in a state of having their optical axes deviating in parallel.

In this instance, the radius of curvature of each lens part is determined in such a manner as to have a flush surface without any stepped surface difference at the cemented boundary. The embodiment thus prevents a loss of light quantity due to any light flux diffusion that otherwise would be caused by an uneven surface joint. Further, the arrangement of this embodiment enables the lens parts to be formed in one unified body without being affected by any stepped or uneven surface joint.

FIG. 7(B) shows the manner in which the radii of curvature of the lens surfaces of the two lens parts 123 and 124 on the object side are to be determined. Referring to FIG. 7(B), the illustration includes the lens surfaces 123a and 124a of lens parts 123 and 124 disposed on the object side; and points $O_1$ and $O_2$ which represent the centers of curvature of the lens surfaces 123a and 124a.

In this specific embodiment, when the lens parts 123 and 124 are cemented together, a line 126 which connects these points $O_2$ and $O_1$ is arranged to be perpendicular to a plane including a boundary 125 obtained when the lens parts 123 and 124 are cemented. This arrangement eliminates any stepped parts throughout the whole boundary.

Figure 8:
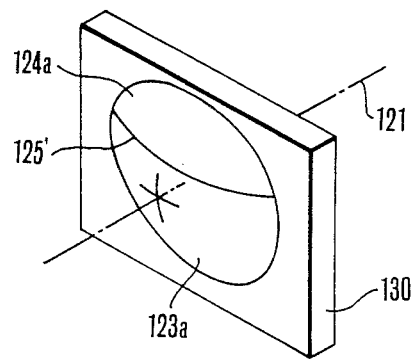
FIG. 8 is an oblique view showing the same projecting lens.

FIG. 8 shows in an oblique view a lens carrying plate 130 arranged to carry the lens parts which are cemented without any stepped surface part at a boundary 125'.

With a pattern illuminated by a light source 4 in the manner as shown in FIG. 4, the embodiment which is arranged as described above projects the images of the pattern by the two lens parts 123 and 124 of the light projecting lens 2 in two directions having different object distances. Generally, a higher degree of illuminance is required for an object located at a far distance. Therefore, the effective area of projection by the lens part 123 is preferably arranged to be larger than that of projection by the other lens 124. The embodiment which is thus arranged to have the pattern image projected both to a far distance and a near distance to cover different object distances is capable of always adequately forming pattern images for objects located within a wide range from a far distance and a near distance.

A reflected pattern image coming from the object is received either by the detecting unit 8 via the photo taking lens unit 1 or by the light receiving element 7 via the light receiving lens 6 which is disposed close to the photo taking lens unit 1. The object distance is measuring or the focusing state of the photo taking lens unit 1 is detected by using a signal produced from the detecting unit 8 or the light receiving element 7. Then, the focusing lens group within the photo taking lens unit 1 is shifted by a driving device (not shown) to bring the lens unit 1 into an in-focus state.

The arrangement of this embodiment to project the pattern may be changed to simply project a light flux produced from the light source; to receive a reflected light flux from the object; and to detect the incident position or intensity of the reflected light flux.

Further, in accordance with this invention, the light projecting system may be arranged to illuminate the whole distance measuring range and to use the light as an auxiliary illumination light in the passive method.

The following shows some specific numerical examples of the light projecting lens arranged according to this invention. In each of the examples, R1 and R2 represent the radii of curvature of the lens surfaces on the object side and on the light source side; D represents lens thickness; N represents a refractive index; and the lens is made of an acrylic resin material;

Numerical Example 1

Lens Part for Far Distance:

|   | R      | D    | N       |
|---|--------|------|---------|
| 1 | 12.30  | 6.50 | 1.49171 |
| 2 | −69.66 |      |         |
|   |        | f = 21.83 |    |

Lens Part for Near Distance:

|   | R      | D    | N       |
|---|--------|------|---------|
| 1 | 12.50  | 6.74 | 1.49171 |
| 2 | −69.70 |      |         |
|   |        | f = 22.15 |    |

The lens part for the near distance is located in the lower part of the light projecting lens. The distance between the optical axes of the two lens parts is $\Delta = -1$. The boundary between the two lens parts is located $H = 2$ above the optical axis of the lens part for the far distance.

Numerical Example 2

Lens Part for Far Distance:

|   | R      | D    | N       |
|---|--------|------|---------|
| 1 | 12.30  | 6.50 | 1.49171 |
| 2 | −69.66 |      |         |
|   |        | f = 21.83 |    |

Lens Part for Near Distance:

|   | R      | D    | N       |
|---|--------|------|---------|
| 1 | 12.18  | 6.36 | 1.49171 |
| 2 | −69.64 |      |         |
|   |        | f = 21.64 |    |

The lens part for the near distance is located in the upper part. The distance between the optical axis of the two lens parts is $\Delta = =1$. The boundary between the two lens parts is located $H = -2$ above the optical axis of the lens part for the far distance.

The invented projecting lens comprises a plurality of lens parts with no stepped difference in surface level at the boundary between the lens parts. This arrangement minimizes a loss in light quantity and enables the light flux of a sharp pattern image to be efficiently projected throughout a wide range of light projection from a far distance to a near distance. The invention gives a highly accurate light projecting system for automatic focus detection which broadens the measurable range of distances.

What is claimed is:

1. A pattern projecting device for focus detection, comprising:
   means for providing a pattern; and
   a projecting lens for projecting said pattern toward an object, said projecting lens being comprised of first and second lens parts which are integral in one unified body and have their optical axes deviating in parallel with each other, said first and second lens parts being disposed to cause a first image forming position in which said first lens part forms an image of said pattern and a second image forming position in which said second lens part forms an image of said pattern to differ from each other, said first and second lens parts each comprising a single lens.

2. A device according to claim 1, wherein said first and second lens parts have different focal lengths.

3. A device according to claim 1, wherein said first and second lens parts are arranged to have their lens surfaces formed continuously and to be flush with each other.

4. A device according to claim 1, wherein the extent of deviation of said optical axes from each other is smaller than the radius of said projecting lens means.

5. A pattern projecting device removably attached to a camera body having a focus detecting system, comprising:
   means for providing a pattern;
   a projecting lens for projecting said pattern toward an object, said projecting lens comprising integral first and second lens parts arranged to form two images of said pattern in positions different from each other.

6. A device according to claim 5, wherein the optical axes of said first and second lens parts deviate from each other and are decentered in parallel, said first and second lens parts each having a plurality of lens surfaces.

7. A device according to claim 5, wherein one lens surface of said first lens part and that of said second lens part are formed continuously and to be flush with each other.

8. A device according to claim 5, wherein said pattern includes at least one stripe extending in the deviating direction of said first and second lens part.

9. A device according to claim 5, wherein said pattern providing means includes a transparent plate on which said pattern is drawn and a light source which is arranged to illuminate said transparent plate.

10. A device according to claim 5, wherein said projecting lens has the curvature of the front surface thereof arranged to be larger than that of the rear surface thereof.

11. A camera system comprising:
    a photo taking system including a photo taking lens unit and an image receiver; and
    a pattern projector for projecting a pattern on an object, said projector including (1) a projecting lens comprising first and second lens parts which are integrally formed in one body with their optical axes arranged to deviate from each other, and (2) pattern providing means for providing a pattern having at least one stripe extending in the deviating direction of said optical axes, said first lens part having a portion extending beyond said second lens part.

12. A pattern projecting device for focus detection, comprising:
    means for providing a pattern; and
    a projection lens for projecting said pattern toward an object, said projection means having integral first and second lens parts having optical axes which deviate from each other, said first lens part having a portion extending beyond a surface of said second lens part.

13. A device according to claim 12, wherein said first and second lens parts have different focal lengths.

14. A device according to claim 12, wherein said first and second lens parts are disposed to cause a first image forming position in which said first lens part forms an image of said pattern, and a second image forming position in which said second lens part forms an image of said pattern to differ from each other.

15. A device according to claim 12, wherein said first and second lens parts are arranged to have a part of their lens surfaces formed continuously and to be flush with each other.

16. A device according to claim 12, wherein the extent of deviation of said optical axes from each other is smaller than the radius of said projecting lens means.

* * * * *

UNITED STATES PATENT AND TRADEMARK OFFICE
CERTIFICATE OF CORRECTION

Page 1 of 2

PATENT NO. : 4,907,026
DATED : March 6, 1990
INVENTOR(S) : Koyama et al.

It is certified that error appears in the above-identified patent and that said Letters Patent is hereby corrected as shown below:

ON THE TITLE PAGE

At [57], line 5 of the Abstract, "objects" should read --object--.

COLUMN 1

Line 5, "continuation-in-part" should be deleted.

COLUMN 2

Line 11, "even" should read --event--.

COLUMN 4

Line 33, "along" should read --alone--.
Line 61, "when" should read --than--.

UNITED STATES PATENT AND TRADEMARK OFFICE
CERTIFICATE OF CORRECTION

PATENT NO. : 4,907,026
DATED : March 6, 1990
INVENTOR(S) : Koyama et al.

It is certified that error appears in the above-identified patent and that said Letters Patent is hereby corrected as shown below:

COLUMN 5

Line 30, "surfaces" should read --surfaced--.
    Line 59, "The," should read --Then,--.

COLUMN 6

Beginning of Line 43, "ing" should read --ed--.

COLUMN 7

Line 38, "$\Delta==1.$" should read --$\Delta=-1.$--

Signed and Sealed this

Sixth Day of October, 1992

Attest:

DOUGLAS B. COMER

Attesting Officer     Acting Commissioner of Patents and Trademarks